US012773363B2

(12) United States Patent
Parks

(10) Patent No.: US 12,773,363 B2
(45) Date of Patent: Oct. 27, 2026

(54) PHYSICAL MEDICINE DROP DEVICE AND METHOD OF USE

(71) Applicant: David Dillon Parks, Kernersville, NC (US)

(72) Inventor: David Dillon Parks, Kernersville, NC (US)

(*) Notice: Subject to any disclaimer, the term of this patent is extended or adjusted under 35 U.S.C. 154(b) by 762 days.

(21) Appl. No.: 18/182,492

(22) Filed: Mar. 13, 2023

(65) Prior Publication Data

US 2023/0285214 A1 Sep. 14, 2023

Related U.S. Application Data

(60) Provisional application No. 63/319,068, filed on Mar. 11, 2022.

(51) Int. Cl.
*A61G 13/00* (2006.01)
*A61G 13/08* (2006.01)

(52) U.S. Cl.
CPC ........... *A61G 13/009* (2013.01); *A61G 13/08* (2013.01)

(58) Field of Classification Search
CPC ........ A61G 13/00; A61G 13/02; A61G 13/06; A61G 13/08; A61G 13/009; A61G 13/128; A61G 13/1295; A61G 2200/32; A61H 1/00; A61H 1/006; A61H 1/008; A61H 2201/123
See application file for complete search history.

(56) References Cited

U.S. PATENT DOCUMENTS

2012/0209157 A1* 8/2012 Racine .................. A61H 1/008 601/99
2022/0265499 A1* 8/2022 Freelend .............. A61G 13/009

OTHER PUBLICATIONS

Linak, "Linak Baselift" (https://www.linak.com/products/linear-actuators/baselift/, Jun. 26, 2020. Accessed from "waybackmachine" on Dec. 2025. (Year: 2020).*
Linak, "BA001" (https://www.linak.com/products/accessories/ba001/#productdatasheet, Jun. 18, 2021. Access from "waybackmachine" on Dec. 2025. (Year: 2021).*

* cited by examiner

*Primary Examiner* — Joseph D. Boecker
*Assistant Examiner* — Jaeick Jang
(74) *Attorney, Agent, or Firm* — Richard C. Piercy, Esq.; Grell & Watson Patent Attorneys LLC

(57) ABSTRACT

A portable physical medicine drop device for performing treatments upon a patient. The device includes powered mechanisms capable of lifting a portion of a patient from a surface, a housing for the mechanisms, and a control means to activate the pushing of a padded element toward the patient when the housing and mechanism are placed between the patient and a surface. Additional mechanisms having additional pads may be incorporated for various chiropractic and physical medicine procedures. A method of use of the portable device to perform treatments upon patients.

20 Claims, 8 Drawing Sheets

PHYSICAL MEDICINE DROP DEVICE AND METHOD OF USE

CROSS-REFERENCE TO RELATED APPLICATIONS

To the full extent permitted by law, the present United States Non-Provisional Patent Application hereby claims priority to and the full benefit of, United States Provisional Application entitled "RECEPTION BOARD PHYSICAL MEDICINE DROP DEVICE" having assigned Ser. No. 63/319,068, filed on Mar. 11, 2022, which is incorporated herein by reference in its entirety.

FEDERALLY SPONSORED RESEARCH OR DEVELOPMENT

None

PARTIES TO A JOINT RESEARCH AGREEMENT

None

REFERENCE TO A SEQUENCE LISTING

None

FIELD OF THE DISCLOSURE

The present disclosure relates to a device and uses of the device for physical medicine. More specifically, the present disclosure relates to a portable device with direct and remote-control capabilities for the chiropractic adjustment of a patient and use thereof.

BACKGROUND

The present disclosure relates to a portable electronically controlled device for use in physical medicine. The device may offer the ability for a professionally trained chiropractor, osteopathic doctor, medical doctor, or a patient to operate the device upon the patient to achieve results commonly achieved through use of a chiropractic table, manual adjustment, and/or electronically controlled chiropractic drop table.

Chiropractic tables, generally, are specialized tables designed for use by chiropractors and other physical medicine providers during spinal (and other joint) manipulation procedures. Chiropractic tables are generally designed to provide chiropractors and their patients with a comfortable and stable platform that supports the patient's body while allowing the chiropractor to adjust the spine and joints to correct spinal misalignments, alleviate pain, make other joint adjustments, the like and/or combinations thereof. Chiropractic tables have a long history, with early designs dating back to the late 1800s and the birth of the specialty. Initially, these tables were relatively basic and designed primarily for patient comfort during use. Over time, chiropractic tables have become more sophisticated, with a wide-ranging designs and features that make them more functional and effective for chiropractic treatment and other uses.

Modern chiropractic tables can be divided into several broad categories, including at least stationary tables, portable tables, and electric tables. Stationary tables are designed for use in a fixed location, while portable tables can be easily moved from one location to another. Stationary tables are usually heavy and may be fixed to a location but generally offer the benefits of being sturdier and may contain heavier padding, which may be more comfortable during use. Portable tables may be made of more lightweight materials and may offer the added ability of collapsing during transport. Electric tables are generally designed to be adjusted electronically, allowing chiropractors to easily adjust the table height and position to optimize patient comfort and treatment efficacy. Electric tables may be stationary or portable, and may be adjusted in various areas to create the intended patient posture during a chiropractic session, or may be further adjusted to accommodate various chiropractor and/or patient sizes (e.g., chiropractor height or patient weight).

Other modern advances in chiropractic tables include tables which have the ability to raise and lower various sections or areas during a chiropractic session. Generally operated by the chiropractor, and generally known as chiropractic drop tables, such tables may be thought of as a tool or device used in the care of a patient, rather than simply an area the patient resides during the care. Chiropractic drop tables are specialized tables used in chiropractic care for spinal adjustments and other chiropractic and physical medicine care. These tables have a unique design that may generally allow the care provider to apply a quick, precise force to specific areas of the spine or other patient area using a technique known as the "drop table technique." The basic design of a chiropractic drop table may generally include a movable section that can be raised and then released using a pneumatic, electronic, or mechanical mechanism. This section is often divided into multiple sections, each of which can be adjusted separately to target specific areas of the spine or patient body.

During a chiropractic adjustment using a drop table, the patient may generally lie face down, or commonly referred to as the "prone position", on the table while the care provider identifies the area of the body that requires adjustment. The chiropractor then applies a quick thrust to the affected area, which may involve using their hands or a small instrument. The adjustment is timed to coincide with the moment when the movable section of the table drops, creating a brief but controlled movement that further facilitates the adjustment. Alternatively, the patient may be simply placed or asked to move to an area of the table where the drop can occur, and the drop is caused without pressure or contact with the patient by the care provider. A chiropractic drop treatment with the assistance of a drop table may generally involve a series of steps, the order of which may be changed based on circumstances of the patient ailment and other factors as may be recognized by those having ordinary skill in the art. The provider may first conduct a thorough evaluation of the patient's condition, including a medical history review, physical examination, and any necessary diagnostic tests. The provider may then ask the patient to lie down on the specialized chiropractic table that has drop sections. These sections may be raised and lowered by the chiropractor to create a dropping motion, either electronically or through a mechanical release. Once in position, the chiropractor may apply a quick and precise force to the joint that needs to be adjusted. This may involve a manual adjustment or the use of an instrument on the patient opposing the table. After applying the adjustment or coincidental with the adjustment, the chiropractor may release the drop section of the table, allowing it to drop down slightly. This drop motion may be intended to help facilitate the adjustment and make it more effective. After the adjustment is complete, the chiropractor may evaluate the patient's response and make any necessary additional adjustments. Post-treatment care: The chiropractor may provide recommendations for post-treatment care, including exercises or stretches to help maintain proper joint alignment and prevent future problems.

In a short amount of time, chiropractic drop tables have become an essential tool in modern chiropractic care, and their design and function have continued to evolve over time. Advances in materials, technology, and engineering have led to the development of increasingly sophisticated drop table designs that can provide improved patient comfort, precision, and outcomes. The drop table technique may be designed to improve the precision and effectiveness of chiropractic adjustments, while reducing the force and/or exertion required to achieve the desired result. It may offer the additional benefit of applying a controlled, metered, and/or consistent force, potentially repetitively. By using the momentum generated by the table drop, the care provider may be able to deliver a more targeted and efficient adjustment that requires less force than traditional adjustment methods that may generally work by hand or through use of physical human force, which may be difficult to control in a consistent, controlled and/or metered manner and may additionally become exhausting for the care provider if done repetitively. As a result, there is a growing interest in developing new and innovative drop table designs that can further enhance the quality and effectiveness of chiropractic care.

Many shortfalls exist in the current offering of chiropractic tables and chiropractic drop tables. One shortfall of existing chiropractic and chiropractic drop tables, whether they be of the portable, electric, or stationary variety, is the overall weight and size of the tables. While some manufacturers may offer designs that are more portable than others, most would require one or more people to collapse and carry the table, and may even require large vehicles or specialized vehicle equipment/accessories. While a patient table may be needed and may in fact be ubiquitous in any medical setting, specialized tables having installed therein capabilities to achieve chiropractic drops are also often expensive. If an existing medical table were to be adapted for and/or used in connection with a device enabling these techniques, expenses can be reduced and corresponding waste of durable equipment can be eliminated. For specialized tables, this problem may be aggravated because updates, advances, and new features may often require the purchase and/or installation of an entirely new table, which is also wasteful. Despite the overall size, weight, and expense of these tables, they often do not meet the capacity requirements of some patients. While many variations exist, some very sturdy chiropractic drop tables may only accommodate patients weighing 250 lbs. or less. According to Gallop, the average adult man in the United States reported a weight of 200 lbs. as of 2020. Given that many patients are larger than this average, especially those who may need extensive specialized physical medicine care related to carrying such weight, many patients seeking chiropractic care may exceed this weight and may not be able to benefit from the use of this state-of-the-art equipment and treatment option. While other patient tables may exist to handle greater capacities, they may not be offered having the features as described herein, and the corresponding drop capabilities may not be able to lift and lower such patients reliably or without exerting unnecessary wear on the motors or gears therein. Finally, while chiropractic drop tables may be priced commensurate with patient tables, with an understandable added expense due to their specialized features and electronic/mechanical parts, such pricing may prohibitively affect adoption of the chiropractic drop technique and its benefits outside of a medical provider's office. Hence, various at home and/or personal uses of chiropractic drops may only be available to those resourced to both afford and be able to transport/store such a large, expensive, and unwieldy device. A smaller, portable, more affordable device capable of offering many, if not all, of the same benefits may allow the procedure to become available in home settings, in addition to uses such as massage therapy, physical therapy, sports medicine, the like and/or combinations thereof.

Therefore, there exists a long-felt and unresolved need for a device which provides a portable option for providing chiropractic drop table functionality on patient tables and other surfaces for the treatment of spinal and other body discomfort and/or ailments, to solve the issues related to the impracticality of doing so with the existing devices detailed herein.

SUMMARY

The present disclosure may solve the aforementioned limitations of the currently available chiropractic drop tables, systems and methods by providing a physical medicine drop device and method of use.

Accordingly, in one aspect, the present disclosure may encompass a physical medicine drop device which can be placed between a patient and a surface upon which the patient rests. The device may comprise a housing having at least one surface atop the housing, and the surface may be understood to have a top plane. The device may include two or more pushing mechanisms, each connected to a padded element having a padded surface aligned substantially with the top plane of the housing. The pushing mechanisms may be controlled by corresponding actuators, either on the device or via a remote/wireless connection, the actuators capable of causing the padded elements to be pushed above the at least one surface via the pushing mechanisms. A power supply may also be included, the power supply capable of powering the device and electrifying the pushing mechanisms thereof. The power supply may be directly connected to the electrical system of a building, vehicle, or similar construction, may connect to such an electrical system via a separate power adapter, or may be a rechargeable battery capable of receiving via the electrical system and storing the electricity thereof within the device for discharge into the mechanisms during use to supply power thereto.

In some embodiments, the device may include four pushing mechanisms connected to four padded elements, each with a corresponding control actuator. Such control actuators can similarly be of the device (i.e., assembled thereon) or be remotely activated actuators housed on a remote activation device (e.g., wired or wireless controller). The remotely activated actuators may be buttons that cause the corresponding pads to lift via the corresponding lifting mechanisms or may be of the switching variety that may cause actuation of the intended pushing mechanisms upon the pressing/actuation of a main actuator. The activation button of the remote actuation device may transmit signals to the physical medicine drop device, causing the corresponding pushing mechanisms to push the corresponding padded element.

Perhaps importantly, exemplary devices of the disclosure may provide consistent, precise, and/or measured lifting forces upon a patient. Additionally, devices of the disclosure may provide these lifting forces in succession and may do so or be programmed to do so quickly and repeatedly. In certain embodiments of the method of the disclosure, these consistently delivered precision lifting forces done in quick succession may be accompanied by pressure applied opposite of the device on the patient, whether through manual force (from e.g., a medical provider's hands) or through a device or apparatus in order to provide a treatment as described herein or as known by those having ordinary skill in the art.

Various additional features of the physical medicine drop device may be present and/or included in some embodiments. These may include but are not limited to a housing back and/or bottom to enclose the various mechanisms thereof, knobs or other mechanisms to increase/decrease the pressure and/or distance of the lifting mechanisms, removable or non-removable batteries, rechargeable or non-rechargeable batteries, replaceable pads, pads in the sizes and shapes known to those having ordinary skill in the art, the like and/or combinations thereof. Variations may exist among the parts, mechanisms, assemblies, technologies, and features of the physical medicine drop device of the disclosure. Specific parts, mechanisms, assemblies, technologies, and features specifically recited herein are for exemplary and non-limiting purposes only and any substitution may be made by those having ordinary skill in the art in order to achieve one or more of the benefits recited herein.

One use of the physical medicine drop device may be for the safe and convenient delivery of physical medicine procedures upon a patient without the use of a larger, more expensive, and less adaptable chiropractic drop table. The device's design may allow for the controlled lifting of areas of a patient during such procedures, either absent any other physical forces or during the manual pressure placed by a physical medicine provider in the opposing direction of the pushing mechanism and pads. It may offer more convenient uses in settings where drop table installation may be impossible or otherwise impracticable, such as home healthcare use, mobile healthcare use, home self-assisted physical therapy, or other uses known to a person having ordinary skill in the art. Optional embodiments featuring wireless control options may add both convenience and allow the device to be placed in areas inaccessible during treatment. The device can be powered by either a power adapter or a rechargeable battery, making it suitable for a variety of settings, including home use or clinical environments.

The device of the disclosure may offer a total of four paddles or padded elements capable of raising a patient from a patient surface, but the disclosure is not so limited. In the embodiments disclosed herein, various features and mechanisms may allow the device of the disclosure to accomplish its intended result in a substantially portable and lightweight form. As disclosed, such a device may only weigh approximately 12 lbs. while being capable of lifting over 100 lbs. of patient weight per paddle. Variations of the disclosed device may include more (e.g., six) or fewer (e.g., two) paddles in order to offer either similar benefits in a smaller, more portable, more affordable form or similar benefits to patient areas of more distant spacing in a single placement in a smaller size. Additionally, while paddles of the disclosure are illustrated in one size, they may be smaller and/or larger in various uses in order to better focus and/or distribute their lifting forces upon a patient. Finally, while physical medicine providers and chiropractors are mentioned at length, the uses of devices of the disclosure are not so limited and may include home uses by patients themselves, massage professional/therapy uses on massage clients, home massage, physical therapy uses for professional and/or home use by those needing physical therapy, sports medicine uses, the like, and/or combinations thereof.

In one aspect, the device of the disclosure may offer other additional benefits over chiropractic drop tables and other devices used to assist physical medicine providers in implementing and/or providing the drop technique to their patients. Since the device of the disclosure may offer the ability to lift heavy loads quickly, it may create an additional vibratory effect on soft tissue, augmenting patient care. Given that not all conditions, ailments, and other physical medicine concerns are due to joint fixation, may also involve soft tissue restriction (e.g., muscle and tendon tightness). Indeed, since joint and soft tissue mechanoreceptors (anatomy that aids in manual therapy treatment) are stimulated by vibration and stretches, perhaps in addition to joint mobilization, a device of the disclosure may be able to both address the concerns noted above and provide therapies beyond the current state of the art, even over much larger variations. By enabling a provider to fine tune the power, speed, and repetitiveness of the forces provided via a device of the disclosure, providers may be able to open further possibilities and treatments for their patients, or even enable their patients to continue therapy in a home setting.

The foregoing illustrative summary, as well as other exemplary objectives and/or advantages of the disclosure, and the manner in which the same are accomplished, are further explained within the following detailed description and its accompanying drawings.

BRIEF DESCRIPTION OF THE DRAWINGS

The present disclosure will be better understood by reading the Detailed Description with reference to the accompanying drawings, which are not necessarily drawn to scale, and in which like reference numerals denote similar structure and refer to like elements throughout, and in which.

It is to be noted that the drawings presented are intended solely for the purpose of illustration and that they are, therefore, neither desired nor intended to limit the disclosure to any or all of the exact details of construction shown, except insofar as they may be deemed essential to the claimed disclosure.

DETAILED DESCRIPTION

Referring now to FIGS. 1-8, in describing the exemplary embodiments of the present physical medicine drop device and method of use, specific terminology is employed for the sake of clarity. The present disclosure, however, is not intended to be limited to the specific terminology so selected, and it is to be understood that each specific element includes all technical equivalents that operate in a similar manner to accomplish similar functions. Embodiments of the claims may, however, be embodied in many different forms and should not be construed to be limited to the embodiments set forth herein. The examples set forth herein are non-limiting examples and are merely examples among other possible examples.

The present disclosure addresses the aforementioned limitations of the currently available devices and methods for providing chiropractic and physical medicine drop procedures upon a patient by providing a physical medicine drop device and method of use. As used herein, a chiropractic drop treatment using prior art technology (i.e., a chiropractic drop table) may generally involve the following steps. Patient evaluation: The provider may conduct a thorough evaluation of the patient's condition, including a medical history review, physical examination, and any necessary diagnostic tests. Patient positioning: The provider may ask the patient to lie down on a special chiropractic table that has drop sections. These sections may be raised and lowered by the chiropractor to create a dropping motion, either electronically or through a mechanical release. Joint adjustment: The chiropractor may apply a quick and precise force to the joint that needs to be adjusted. This may involve a manual adjustment or the use of an instrument on the patient opposing the table. Drop section release: After applying the adjustment or in conjunction with the adjustment, the chiropractor may release the drop section of the table, allowing it to drop down slightly. This drop motion may be intended to help facilitate the adjustment and make it more effective. Re-evaluation: After the adjustment is complete, the chiropractor may evaluate the patient's response and make any necessary additional adjustments. Post-treatment care: The chiropractor may provide recommendations for post-treatment care, including exercises or stretches to help maintain proper joint alignment and prevent future problems.

Figure 7:
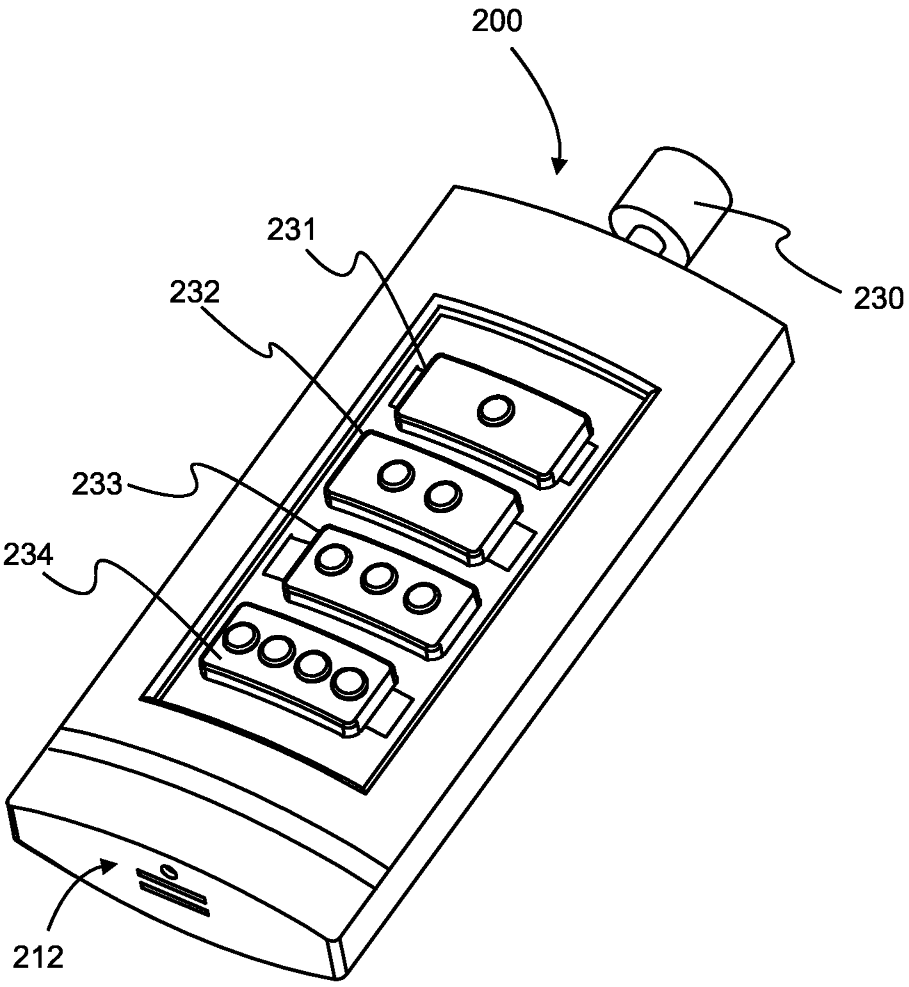
FIG. 7 is a perspective view of an exemplary embodiment of a remote-control device of the disclosure.
Figure 8:
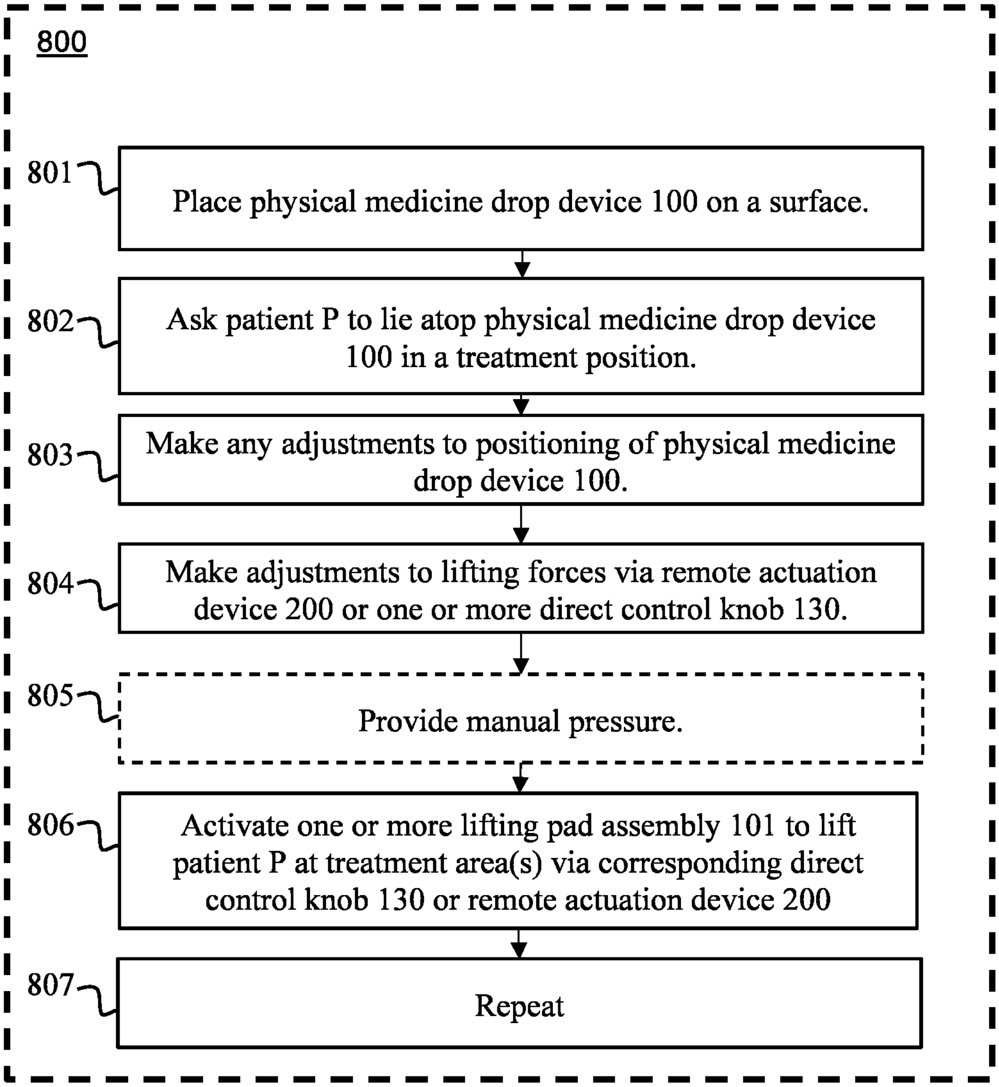
FIG. 8 is a flowchart of a method of use of the exemplary embodiments of the physical medicine drop device and the remote-control device of the disclosure.

Rather than relying on an entire table specifically designed to accomplish a chiropractic or physical medicine drop procedure, a chiropractor or other medical provider may instead utilize physical medicine drop device 100, exemplary embodiments of which are illustrated in FIGS. 1-6 and described herein. Additionally, remote actuation device 200, as illustrated in FIG. 7 may be further provided to further enhance the utility and convenience of physical medicine drop device 100. As will be understood by those having ordinary skill in the art after a review of these illustrative drawings of various embodiments of these devices, and after a review of an exemplary embodiment of a method of use thereof as illustrated in FIG. 8 and described herein, substitution of such a specialized table for physical medicine drop device 100 and other devices of the disclosure can be made. Furthermore, various benefits may be achieved over prior art devices and techniques, as are further described herein.

Figure 1:
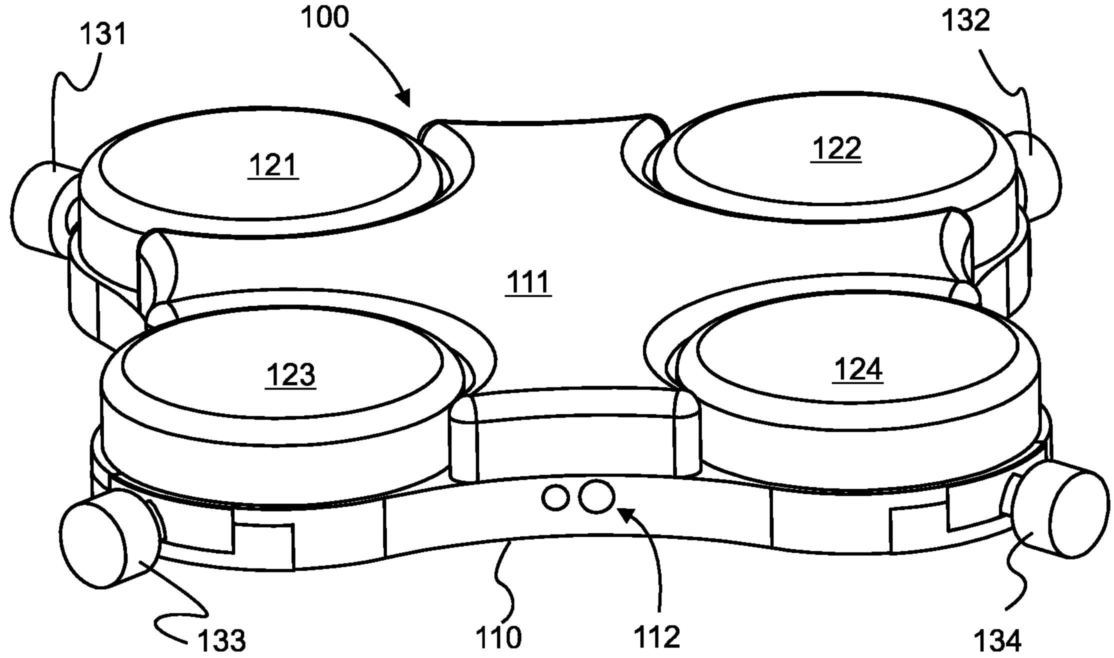
FIG. 1 is a perspective view of an exemplary embodiment of the physical medicine drop device of the disclosure.

Referring now to FIG. 1, therein illustrated is a perspective view of an exemplary embodiment of physical medicine drop device 100. Generally, physical medicine drop device 100 may feature at least one of each: lifting pad 120, direct control knob 130, control knob tension stem 140, and lifting assembly 150 (see, e.g., FIGS. 3A-4B). As illustrated in FIG. 1, an exemplary physical medicine drop device 100 having four of lifting pad 120 (first lifting pad 121, second lifting pad 122, third lifting pad 123, and fourth lifting pad 124), contoured surface 111 separating each lifting pad 120 and coplanar therewith during a down position, four of direct control knob 130 (first direct control knob 131, second direct control knob 132, third direct control knob 133, and fourth direct control knob 134), power port 112, and bottom surface 110. First lifting pad 121, second lifting pad 122, third lifting pad 123, and fourth lifting pad 124 may be generally circular and substantially flat, as illustrated, but may also be of any shape suitable and known to those having ordinary skill in the art. First lifting pad 121, second lifting pad 122, third pad 123, and fourth lifting pad 124 may further be assembled from one material, including but not limited to rubber, foam, plastic, leather, composites, vinyl, the like and/or combinations thereof, or may be assembled from more than one material, including but not limited to suitable padding material to provide comfort and suitable covering material to provide comfort against skin and/or durability. Contoured surface 111 may be similarly appointed to first lifting pad 121, second lifting pad 122, third lifting pad 123, and/or fourth lifting pad 124 or may be constructed of another suitable material. Such materials may be selected for by their comfort, affordability, durability, ease of disinfection/cleaning, other considerations, and/or combinations thereof. Located underneath and extending from each corner where each lifting pad 120 has been located may be each direct control knob 130. In this exemplary embodiment, first direct control knob 131 may extend from first lifting pad 121 and provide control thereof, second direct control knob 132 may extend from second lifting pad 122 and provide control thereof, third direct control knob 133 may extend from third lifting pad 123 and provide control thereof, and fourth direct control knob 134 may extend from fourth lifting pad 124 and provide control thereof. In other potential configurations, location and quantity of lifting pad 120 and direct control knob 130 may vary and are intended to be encompassed by this disclosure. Direct control knob 130 may be knurled and may be capable of doubling as a tension dial. Turning each direct control knob 130 in one direction may increase tension and corresponding pushing power provided by lifting assembly 150. Spinning and/or twisting direct control knob 130 may cause the knob to move inward and outward, and a gauge of tension may be displayed to an operator in a number of ways, including notches upon control knob tension stem 140. Physical medicine drop device 100 may further include power port 112 in order to receive power to electrify the mechanical/electrical devices thereof and may include bottom surface 110, which may house the mechanical and electrical components thereof.

Figure 2:
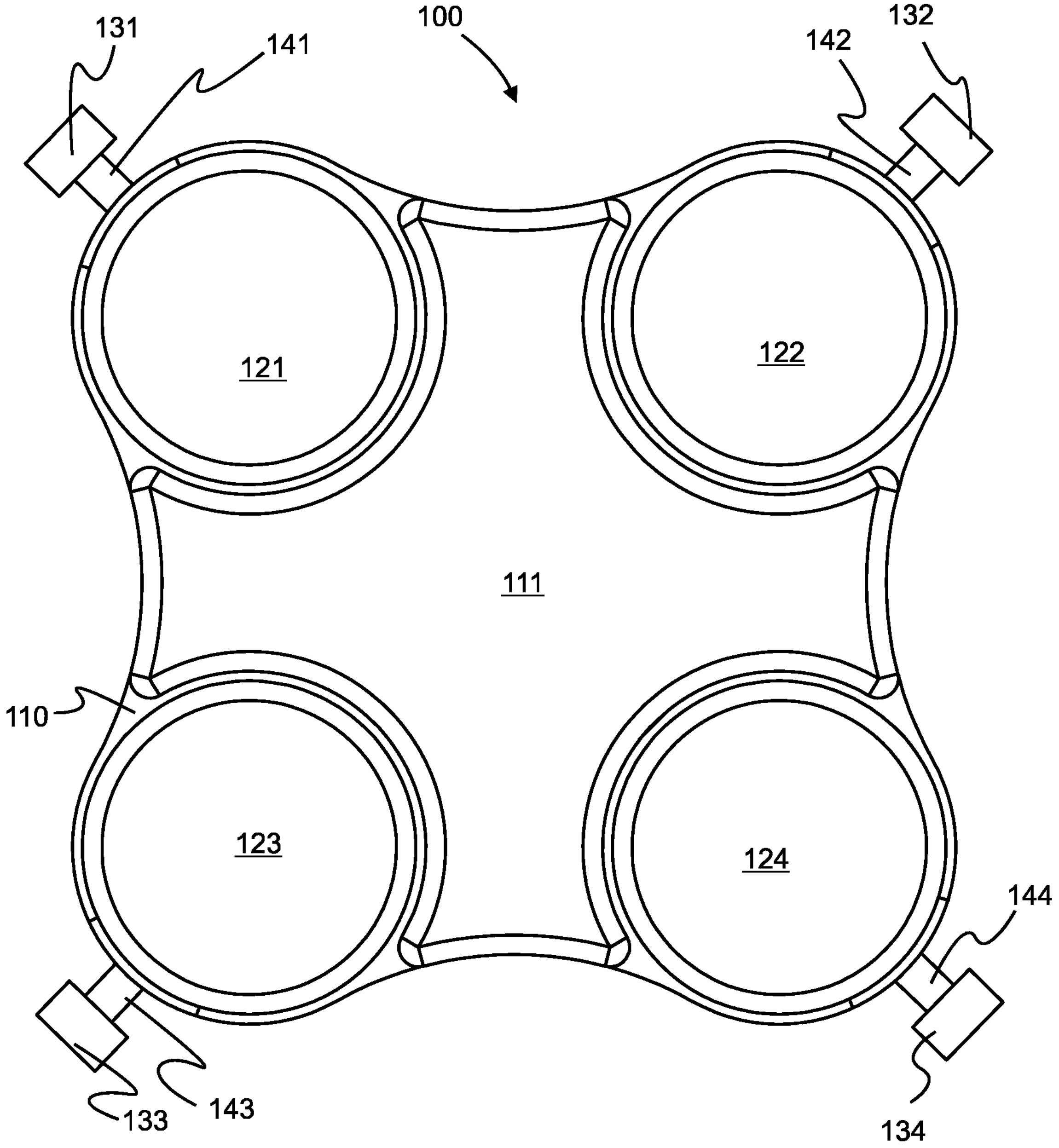
FIG. 2 is a top plan view thereof.

Referring now to FIG. 2, therein illustrated is a top plan view of the exemplary embodiment of physical medicine drop device 100. As described above, physical medicine drop device 100 may feature at least one of each: lifting pad 120, direct control knob 130, control knob tension stem 140, and lifting assembly 150 (see, e.g., FIGS. 3A-4B). In the illustrated configuration physical medicine drop device 100 may have four of lifting pad 120: first lifting pad 121, second lifting pad 122, third lifting pad 123, and fourth lifting pad 124. It may also feature contoured surface 111 separating each lifting pad 120. Extending from each lifting pad 120 may be each of four direct control knob 130: first direct control knob 131, second direct control knob 132, third direct control knob 133, and fourth direct control knob 134, respectively. Control knob tension stem 140 may connect each direct control knob 130 to each corresponding assembly beneath each lifting pad 120: first control knob tension stem 141, second control knob tension stem 142, third control knob tension stem 143, and fourth control knob tension stem 144, respectively. First lifting pad 121, second lifting pad 122, third lifting pad 123, and fourth lifting pad 124, as may be more readily observed in FIG. 2, may be generally circular and, as may be more readily observed in FIG. 1, substantially flat, but may also be of any shape suitable and known to those having ordinary skill in the art. By way of example and not limitation, lifting pad 120 may be beveled around an upper surface outer edge and may be slightly concave. As stated above, first lifting pad 121, second lifting pad 122, third lifting pad 123, and fourth lifting pad 124 may further be assembled from one material from more than one material, such as a padding material covered by leather. Contoured surface 111 may be similarly constructed, although it may also be made from other suitable materials. Located underneath and extending from each corner where each lifting pad 120 has been located may be each direct control knob 130: first direct control knob 131 may extend from first lifting pad 121 and provide control thereof, second direct control knob 132 may extend from second lifting pad 122 and provide control thereof, third direct control knob 133 may extend from third lifting pad 123 and provide control thereof, and fourth direct control knob 134 may extend from fourth lifting pad 124 and provide control thereof. Connecting each direct control knob 130 to each assembly to control each lifting pad 120 may be each control knob tension stem 140, which may be labeled or notched to indicate the tension adjustment thereon (see FIGS. 3A-4B). As described above, each direct control knob 130 may be knurled and may be capable of doubling as a tension dial. Turning each direct control knob 130 in one direction may increase tension and corresponding pushing power provided by lifting assembly 150. Spinning and/or twisting direct control knob 130 may cause the knob to move inward and outward, and a gauge of tension may be displayed to an operator in a number of ways, including notches upon control knob tension stem 140. Tension may also be achieved, for example, through use of a digital adjustment or via remote actuation device 200.

Having reviewed an embodiment of physical medicine drop device 100, a person having ordinary skill in the art may observe various qualities, features, and characteristics that may be relevant to the utility and overall advantages of physical medicine drop device 100 and a method of use of the same. These may include but are not limited to the following. Physical medicine drop device 100 may generally be of compact and portable size. When compared to table alternatives physical medicine drop device 100 may be, for instance, less than 10% of the size and weight of a drop table alternative. Physical medicine drop device 100 may be of varying thickness, though a thin design as illustrated in FIGS. 1-2 may be preferable in order to minimize the amount of space required between the patient and the patient surface/table to accommodate physical medicine drop device 100. Such considerations to thickness of physical medicine drop device 100 may prevent significant patient discomfort that may occur in otherwise thicker designs. While width and length of physical medicine drop device 100 may generally be variable, a preferred embodiment may be designed such that each lifting pad 120 touches each area of a patient body for the intended treatment area to be optimally treated, and can be of custom design to accommodate various of such treatments. After being placed, physical medicine drop device 100 may generally provide its pushing operation at multiple zones simultaneously. Additionally, each zone may be capable of independent control by the provider. The power of pushing operations may be controlled using any number of means disclosed above to adjust the distance, speed, or general lifting force during an activation of the lifting system of physical medicine drop device 100. The pushing operations may further be capable of being performed rapidly in succession to further enhance the treatment.

Having illustrated and described an embodiment of physical medicine drop device 100, these and other various features of physical medicine drop device 100, including various components of a potentially preferred embodiment, various treatment scenarios and positions, remote actuation device 200, and method of use of physical medicine drop device 100 will be better understood through a review of the description related to FIGS. 3A-4B, 5A-6B, 7, and 8, respectively.

Figure 3A:
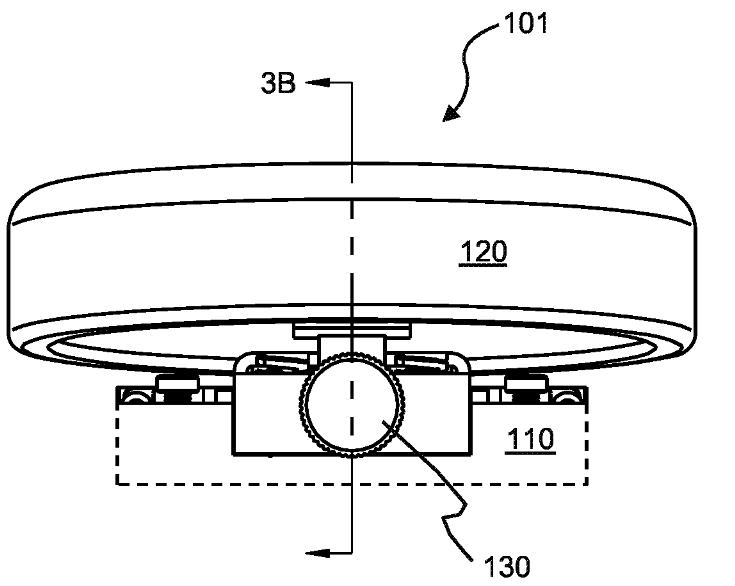
FIG. 3A is a front elevation view of an exemplary embodiment of a lifting pad assembly of the exemplary physical medicine drop device of the disclosure.

Referring now to FIG. 3A, therein illustrated is a front elevation view of an exemplary embodiment of lifting pad assembly 101 of physical medicine drop device 100. From this vantage, lifting pad assembly 101 can be observed to include lifting pad 120 atop direct control knob 130. Lifting pad assembly 101 may be installed therein bottom surface 110 or bottom surface 110 may be configured to house and/or cover one or more of the bottom and internal components of lifting pad assembly 101. As mentioned above and as illustrated therein FIG. 3A, direct control knob 130 may be knurled and capable of doubling as a tension dial. Turning each direct control knob 130 in one direction may increase tension and corresponding pushing power provided by lifting assembly 150. Spinning and/or twisting direct control knob 130 may cause the knob to move inward and outward, and a gauge of tension may be displayed to an operator in a number of ways, including digitally or on notches upon control knob tension stem 140. As described above, lifting pad 120 may be constructed from one material or many. This material or combination of materials may include but is not limited to: rubber, foam, plastic, leather, composites, vinyl, the like and/or combinations thereof. A potentially preferred combination of materials to construct lifting pad 120 may include a padding constructed from a dense foam, soft plastic, or rubber material covered in medical-grade leather or leather alternative. Having described those features of lifting pad 120 from the vantage illustrated in FIG. 3A, additional components visible in a cross-sectional view taken at arrow 3B of FIG. 3A are illustrated in 3B and described directly below.

Figure 3B:
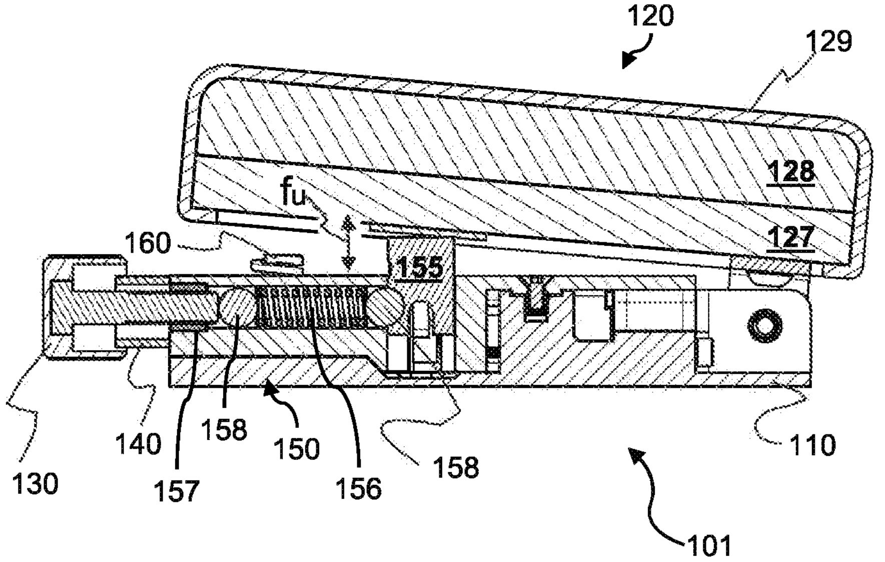
FIG. 3B is an elevation cross-sectional view thereof taken from the 3B arrow of FIG. 3A.

Referring now to FIG. 3B, therein illustrated is an elevation cross-sectional view of the exemplary embodiment of lifting pad assembly 101 of physical medicine drop device 100 taken from the 3B arrow of FIG. 3A. From this cross-sectional perspective and side-view, internal features of lifting pad 120, in a potentially preferred embodiment, can be better observed and detailed. Beginning with lifting pad 120, as the cross-section may indicate, the assembly thereof may consist of multiple layers or sub-assemblies in this potentially preferred embodiment. Such sub-assemblies may include (in bottom-to-top order) lifter plate 127, padding 128, and covering 129. Lifter plate 127 may optimally be comprised of ½" birch plywood or other sized suitable materials such as other woods, other natural materials, metals, composite materials, plastics, dense rubbers, the like and/or combinations thereof. Padding 128 may optimally be comprised of ¾" XLP foam or other sized suitable materials such as other irradiated closed cell foam(s), other foams and foam materials, cotton and other fibers, animal products, non-woven materials, rubber(s), the like and/or combinations thereof. Covering 129 may optimally be comprised of ⅛" leather or other sized suitable materials such as other leathers, treated leathers, leather-like or imitation leather materials, vinyl sheets, other synthetic materials and coverings, a (disposable) wrapping, the like and/or combinations thereof. As contemplated herein, covering 129 may be optimally covered with a specially designed disposable or other disposable wrapping to minimize cleaning and to prevent transfer of materials between patients. Lifter plate 127, padding 128, and covering 129 may be assembled via fastening, sewing, adhesives, welding, friction, threading, staples, the like, other known means or combinations of means of assembly techniques known to those having ordinary skill in the art. Turning to the internal structures of physical medicine drop device 100 and lifting pad assembly 101, lifting assembly 150 may generally comprise a base to house lifting assembly 150, which may be machined, 3D printed, or injection-molded plastic and/or metal, or may be manufactured by other means known to those having ordinary skill in the art, and may be secured to bottom surface 110 or housed therein. Lifting assembly 150 may include a motor consisting generally of the parts: horn(s) 170 (see e.g., FIG. 4B), tension block(s), lifter pin(s) 155, lateral die spring(s) 156, washer(s), bearing(s) 158, and insert(s) 157. Lifting assembly 150 may be connected to, for instance, direct control knob 130 via control knob tension stem 140 and be controlled by direct control knob 130. Additionally, as indicated herein FIG. 3B, lifting assembly 150 may be connected to direct control knob 130 and/or control knob tension stem 140 via bolt 159, which may be a 5⁄16"×1.375" stainless steel bolt, which may be connected to insert(s) 157. The motor of lifting assembly 150 and the various parts thereof may be constructed using various shapes, sizes, specifications, and materials. The motor(s) of lifting assembly 150 may be of the servo variety and may be rated to 50 Kg and require 14V for operation. Horn(s) 170 may be constructed of machined aluminum, steel, alloys thereof, or other suitable metals or other materials. The tension block(s) substantially encompass, for instance, bearing(s) 158, die spring(s) 156, insert(s) 157, and/or washer(s) and may be machined or injection molded plastic, or other suitable materials. Lifter pin(s) 155 may be ⅝" in diameter and may be constructed of DELRIN® (polyoxymethylene plastic) or other suitable materials, including other plastics, other synthetic materials, metals, alloys thereof, composites, wood, and other natural materials. Die spring(s) 156 may be constructed to have a ⅜" hole diameter and may be 1" long, and/or may be made of any material capable of biasing and/or flexing in the manner of a spring. Washer(s) may be of various shapes and sizes, but may optimally have 0.174" inside diameter 0.375" and outer diameter and be made of steel or other alloys. Lifting assembly 150 may be attached to and operably combined with lifting pad 120 through various ways known to those skilled in the art, but may be optimally attached and operably combined via a plate hinge and bolts/screws. The lifting force may transfer from lifting assembly 150 to lifting pad 120 via activation of the motor and upward protrusion of lifter pin(s) 155, which may be subsequently dampened by one or more upward-facing die spring 160. This force may occur in direction $f_u$.

Figure 4A:
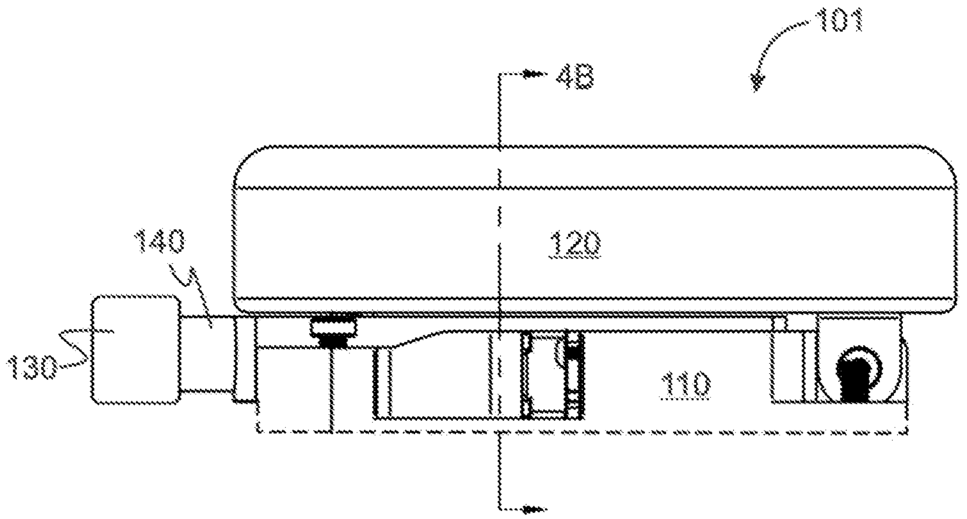
FIG. 4A is a side elevation view thereof.

Referring now to FIG. 4A, therein illustrated is a side elevation view of the exemplary embodiment of the lifting pad assembly of physical medicine drop device 100. From this vantage, lifting pad assembly 101 can be observed to include lifting pad 120 atop direct control knob 130. Lifting pad assembly 101 may be installed therein bottom surface 110 or as otherwise described herein. As mentioned above, illustrated therein FIG. 3A, direct control knob 130 may be knurled or otherwise manufactured to enhance gripping capabilities and may be capable of doubling as a tension dial. Turning each direct control knob 130 in one direction may increase tension and corresponding pushing power provided by lifting assembly 150. Spinning and/or twisting direct control knob 130 may cause the knob to move inward and outward, and a gauge of tension may be displayed to an operator in a number of ways, including digitally or on notches upon control knob tension stem 140. In an exemplary embodiment, control knob tension stem 140 may be labeled horizontally as illustrated herein FIG. 4A and further include the numbers "1", "2", and "3" along notches to enhance the visibility of adjustments being made. As described and detailed above as it may relate to FIG. 3A, lifting pad 120 may be constructed from one material or many as detailed above. Having described those features of lifting pad 120 from the vantage illustrated in FIG. 3A, additional components visible in a cross-sectional view taken at arrow 3B of FIG. 3A are illustrated in 3B and described directly below.

Figure 4B:
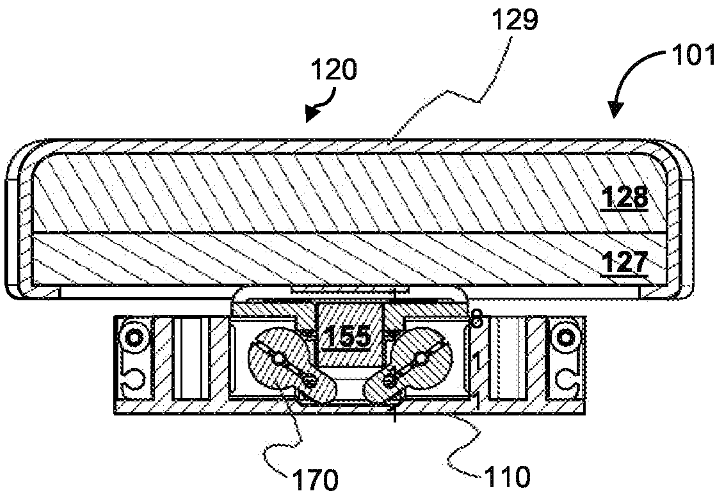
FIG. 4B is an elevation cross-sectional view thereof taken from the 4B arrow of FIG. 4A.

Referring now to FIG. 4B, therein illustrated is an elevation cross-sectional view of the exemplary embodiment of lifting pad assembly 101 of physical medicine drop device 100 taken from the 4B arrow of FIG. 4A. From this cross-sectional perspective and front view, internal features of lifting pad 120, in a potentially preferred embodiment, can be better observed and detailed. Beginning with lifting pad 120 the assembly thereof may consist of multiple layers in this potentially preferred embodiment. Such layers may include, lifter plate 127 on bottom of lifting pad 120, padding 128, and covering 129 on top of lifting pad 120. Lifter plate 127 may optimally be comprised of ½" birch plywood or other sized suitable materials as detailed above (see FIG. 3B). Padding 128 may optimally be comprised of ¾" XLP foam, other sized suitable materials such as other irradiated closed cell foam(s), or other materials as detailed above (see FIG. 3B). Covering 129 may optimally be comprised of ⅛" leather or other sized suitable materials such as those other materials detailed above (see FIG. 3B). As contemplated herein, covering 129 may be optionally covered with an additional disposable cover. Lifter plate 127, padding 128, and covering 129 may be assembled and/or joined together to form lifting pad 120 as described above. Turning to the internal mechanisms of physical medicine drop device 100 and lifting pad assembly 101, as may be observed in this cross sectional view and that of FIG. 3B, lifting assembly 150 may generally include a base to house lifting assembly 150, be manufactured as detailed above, and be secured to bottom surface 110 or housed therein bottom surface 110. Lifting assembly 150 may include a motor consisting generally of the parts: horn(s) 170, tension block(s), lifter pin(s) 155, lateral die spring(s) 156 (see FIG. 3B), washer(s), bearing(s) 158 (see FIG. 3B), and insert(s) 157. Lifting assembly 150 may be connected to, for instance, direct control knob 130 via control knob tension stem 140 and be controlled by direct control knob 130. Additionally, as indicated herein FIG. 3B, lifting assembly 150 may be connected to direct control knob 130 and/or control knob tension stem 140 via bolt 159, which may be a 5⁄16"×1.375" stainless steel bolt, which may be connected to insert(s) 157. The motor of lifting assembly 150 and the various parts thereof may be constructed using various shapes, sizes, specifications, and materials. The motor(s) of lifting assembly 150 may be of the servo variety and may be rated to 50 Kg and require 14V for operation. Horn(s) 170 may be constructed of machined aluminum, steel, alloys thereof, or other suitable metals or other materials. The tension block(s) substantially encompass, for instance, bearing(s) 158, die spring(s) 156, insert(s) 157, and/or washer(s) and may be machined or injection molded plastic, or other suitable materials. Lifter pin(s) 155 may be 5⁄8" in diameter and may be constructed of DELRIN® or other suitable materials as detailed above. Die spring(s) 156 may be constructed to have a 3⁄8" hole diameter and may be 1" long, and/or may be made of those materials as classified above. Washer(s) may be of various shapes and sizes, but may optimally have 0.174" inside diameter 0.375" and outer diameter and be made of steel or other alloys. Lifting assembly 150 may be attached to and operably combined with lifting pad 120 through various ways known to those skilled in the art, but may be optimally attached and operably combined via a plate hinge and bolts/screws. The lifting force may transfer from lifting assembly 150 to lifting pad 120 via activation of the motor and upward protrusion of lifter pin(s) 155, which may be subsequently dampened by one or more upward-facing die spring 160. This force may occur in direction $f_u$ (see FIG. 3B). Having fully described an exemplary embodiment of physical medicine drop device 100 and its internal mechanisms such as lifting pad assembly 101 in such an exemplary embodiment, further understanding of physical medicine drop device 100 and lifting pad 120 in relation to a patient and a physical medicine provider's provision of care can be obtained from a review of the remaining Drawings and related Detailed Description.

Figure 5A:
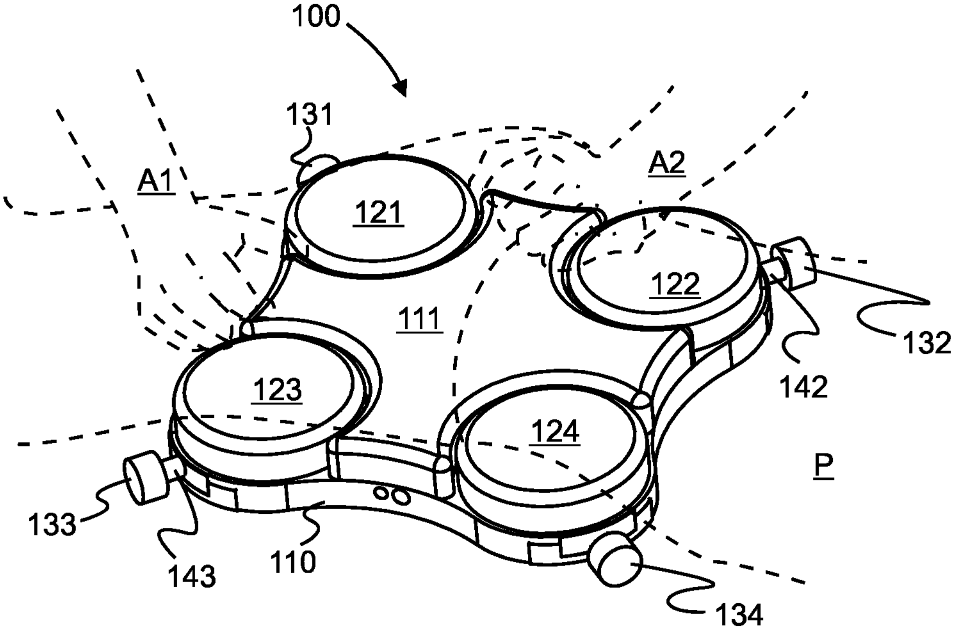
FIG. 5A is a perspective view of the exemplary embodiment of the physical medicine drop device of the disclosure showing exemplary patient and physical medicine provider interactions thereof.
Figure 5B:
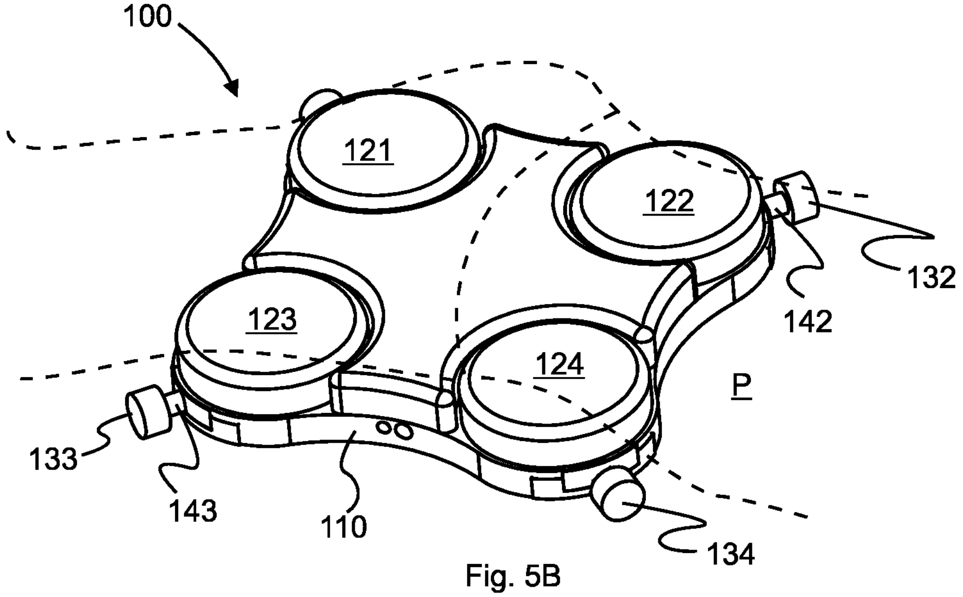
FIG. 5B is another perspective view of the exemplary embodiment of the physical medicine drop device of the disclosure showing an exemplary patient's interaction thereof.

Referring now to FIGS. 5A-5B, therein illustrated are perspective views of the exemplary embodiment of physical medicine drop device 100 showing exemplary patient P in a prone position upon physical medicine drop device 100 and, in FIG. 5A arms A1, A2 of a physical medicine provider according to an embodiment of a method of treatment according to the disclosure. As described in more detail above, physical medicine drop device 100 may generally include radially placed about contoured surface 111: first lifting pad 121 corresponding to first direct control knob 131, second lifting pad 122 corresponding to second direct control knob 132, third lifting pad 123 corresponding to third direct control knob 133, fourth lifting pad 124 corresponding to fourth direct control knob 134. Beneath the radial lifting pad 120 and their corresponding assemblies may be bottom surface 110. As illustrated, physical medicine drop device 100 may generally conform to an average human patient P, and be sized to appropriately span the width of the skeleton at its back/front. Physical medicine drop device 100 may be placed on a surface, such as a table, and patient P may be asked to lie atop physical medicine drop device 100 on their stomach, for instance, in what may be known as the prone position. Once in position, a physical medicine provider may make additional corrections to placement of physical medicine drop device 100 with respect to patient P and the anatomical features thereof. The physical medicine provider may further adjust the pushing force generated at each lifting pad 120 via the mechanisms of lifting pad assembly 101 by turning direct control knob 130 to the setting appropriate for the treatment. Then, the provider may optionally position right arm A1 and/or left arm A2 above patient P, place his or her hands upon one or more areas of patient P, and apply pressure thereto. Then, the provider may use one of direct control knob 130 to actuate one or more lifting pad assembly 101 to push the corresponding lifting pad 120 above contoured surface 111. As illustrated in FIG. 5B, the medical provider may also opt to provide the drop therapies without the use of his or her arms, and may instead simply actuate the mechanisms absent manual pressure applied from above.

Figure 6A:
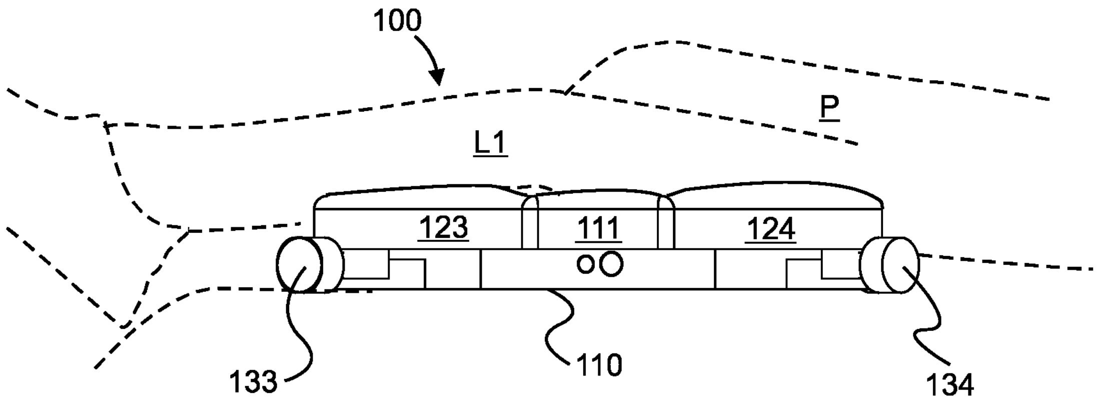
FIG. 6A is a side elevation view of the exemplary embodiment of the physical medicine drop device of the disclosure showing another exemplary patient's interaction thereof.
Figure 6B:
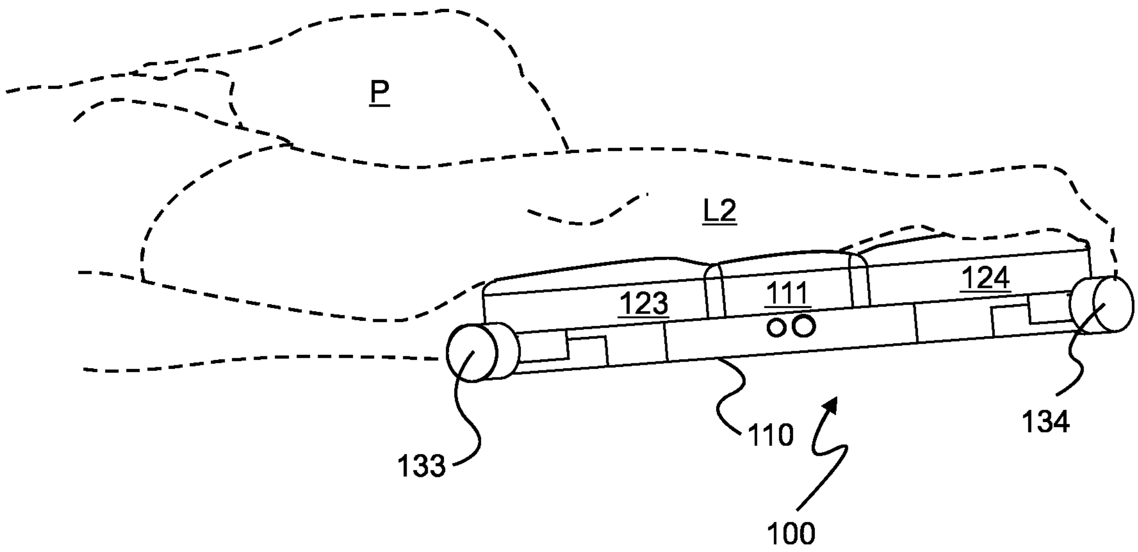
FIG. 6B is another side elevation view of the exemplary embodiment of the physical medicine drop device of the disclosure showing yet another exemplary patient's interaction thereof.

Referring now to FIG. 6A-6B, therein illustrated are side elevation views of the exemplary embodiment of physical medicine drop device 100 showing exemplary patient P in other positions of the disclosure, namely with patient P placing leg L1 upon physical medicine drop device 100 (FIG. 6A) or by placing arm L2 in another position (FIG. 6B). The positions are illustrated above physical medicine drop device 100 with third direct control knob 133 corresponding to third lifting pad 123, fourth direct control knob 134 corresponding to fourth lifting pad 124, contoured surface 111, and bottom surface 110 visible.

Having illustrated and described various internal structures and mechanisms of physical medicine drop device 100 herein FIGS. 3A-4B, one having ordinary skill in the art should recognize the disclosure has provided one of many potential ways to effectuate a drop technique using a thin, lightweight, portable device between a patient. Various benefits of the disclosed mechanisms and other features may include a thin device capable of providing a lifting power to a single area of a patient, or to multiple areas at once. Such a thin device may be capable of lifting an area of a patient exceeding 100 lbs. without requiring the patient be similarly compact and lightweight. For instance, a very heavy patient may be rested upon a sturdier table capable of reliably holding their weight, and physical medicine drop device 100 may be placed between the patient and the sturdy surface. Since there is not a need for physical medicine drop device 100 to continuously reliably hold the patient, but only suspend an area during a treatment, such 100 lbs. lifting forces delivered to an area may be achievable, when it would not have otherwise been using a specialized drop table. Additionally, one having ordinary skill in the art may observe from the mechanisms described herein as they relate to physical medicine drop device 100 and lifting assembly 150, one or more possible steps to achieve the therapy as disclosed herein using physical medicine drop device 100. As detailed above, direct control knob 130 may provide a dual function to enable adjustment of forces provided during operation via turning a knob, while also serving as an actuator for lifting assembly 150. When activated, lifter pin 155 may move between its down position and its up position. Lifter pin 155 may do so by being pushed by one or more of horn(s) 170 via springs, tension blocks, levers, the motor, or other parts thereof lifting assembly 150. Variable force may be enabled by adjustments of the springs, washers, ball bearings, and lifter pin 155. As may be understood by one having ordinary skill in the art, other additional parts, mechanisms, or features may be added, substituted, and/or removed to meet certain considerations, such as increased power, which are intended to be encompassed by this disclosure.

Having illustrated and described various internal structures and mechanisms of physical medicine drop device 100, certain considerations may be made by those having ordinary skill in the art in order to offer a device safe, reliable, and capable of delivering effective treatment. Some of those considerations are outlined herein. With regard to safety, one concern may be if one or more internal mechanisms of physical medicine drop device 100, or more specifically, lifting assembly 150, became stuck in an upward position, which may cause lifter pin(s) 155 to remain in the up position when a patient and/or physical medicine provider applies downward force, which could risk bodily injury to the patient. In some embodiments of physical medicine drop device 100, lifter pin 155 may need a moment to move downward after lifting before a user and/or provider should apply downward force, to avoid such injury. In some embodiments, a mechanical switch may be added and paired with, e.g., a small red/green LED light. When the mechanical features of lifting assembly 150 are in position to cause lifter pin 155 to be up, it may be red. When such mechanical features are in position to cause lifter pin 155 to be down, it may be green. In such an example, pressure could be applied in a downward direction when a green light is indicated. Other fail-safe features could be built in, such as designing couplers/levers of lifting assembly 150 to break, rather than risking the breaking of more expensive components, such as motors. Additionally, space for and the housing of various internal components of physical medicine drop device 100 may be contemplated herein. For example, one or more of lifting assembly 150 may be housed under each lifting pad 120, batteries, micro transmitters, microcontrollers, other computing devices, other electrical/mechanical parts, cabling thereof, the like and/or combinations thereof, may be housed within various sub-component spaces of contoured surface 111 or beneath one or more of lifting pad 120 and above bottom surface 110.

Referring now to FIG. 7, therein illustrated is a perspective view of an exemplary embodiment of remote actuation device 200. Remote actuation device 200 may be assembled and constructed in many form factors, and only one potentially preferred embodiment is illustrated in FIG. 7 and specifically described herein. Remote actuation device 200 as illustrated herein may be constructed to be compatible with physical medicine drop device 100 in its exemplary embodiment illustrated in FIGS. 1-6B and described above. Hence, first switch 231 may correspond to first direct control knob 131 and accomplish the same and/or similar actuation of the pushing mechanisms beneath first lifting pad 121. First switch 231 may be slid from left to right, increasing and/or decreasing the lifting force generated at first lifting pad 121 or disabling it altogether. Second switch 232, third switch 233, and fourth switch 234 may be similarly designed and/or configured and may correspond to second direct control knob 132, third direct control knob 133, and fourth direct control knob 134, respectively. Actuation button 230 may cause a signal to be transmitted to physical medicine drop device 100 to cause correspondingly lifting pad 120 to be lifted, according to how the switches may be set. remote actuation device 200 may be wireless or wired, and may house batteries, which may or may not recharge, for example via remote power port 212. Other envisioned possibilities for remote actuation device 200 may include wired remotes, foot pedals (wired/wireless), control via BLUETOOTH® or other wireless technology, mobile application, the like and/or combinations thereof.

Referring now to FIG. 8, therein illustrated is a flowchart of method 800, which are described to generally instruct one of one exemplary use of the exemplary embodiments of physical medicine drop device 100 and remote actuation device 200. As illustrated in FIGS. 5A-6B and described above, physical medicine drop device 100 may generally conform to an average human patient P, and be sized to appropriately span the width of the skeleton at its back/front. Starting at step 801 of method 800, physical medicine drop device 100 may be placed on a surface, such as a table. At step 802, patient P may be asked to lie atop physical medicine drop device 100 on their stomach, for instance, in what may be known as the prone position or other treatment positions of a provider skilled in the relevant art. Once in position, at step 803, a physical medicine provider may make additional corrections to placement of physical medicine drop device 100 with respect to patient P and the anatomical features thereof. At step 804, the physical medicine provider may further adjust the pushing force generated at each lifting pad 120 via the mechanisms of lifting pad assembly 101 by turning direct control knob 130 to the setting appropriate for the treatment or via remote actuation device 200 as described above. Then, optionally at optional step 805, provider may position arms A1, A2 above patient P, place his or her hands upon one or more areas of patient P, and apply pressure thereto. At step 806, the provider may use one of direct control knob 130 or remote actuation device 200 to actuate one or more lifting pad assembly 101 to push the corresponding lifting pad 120 above contoured surface 111. Then, at step 807, the procedure may be completed or the provider may repeat the procedure through either a repeat of steps 801-806, or only some of the steps as not all are necessarily needed (e.g., repositioning).

With respect to the above description then, it is to be realized that the optimum dimensional relationships, to include variations in size, materials, shape, form, position, function and manner of operation, assembly, mechanisms, forces, power sources, shape of components and use, all of which are intended to be encompassed by the present disclosure.

It is contemplated herein that the device may include a variety of overall sizes and corresponding sizes for and of various parts, including but not limited to: physical medicine drop device 100, remote actuation device 200, components thereof, the like and/or combinations thereof to accommodate different needs. Furthermore, it is contemplated that variations in materials used in the construction of these parts and of the overall device of the disclosure may provide similar or improved results and the disclosure is not so limited to the materials herein described. By way of example and not limitation, though lifting pad 120 may be described as having a foam and/or fabric, various other materials may be used in the construction of the paddles or surfaces thereof, including but not limited to rubber, elastomers, wood, metal, carbon fiber, fiberglass, composite materials, natural materials, the like and/or combinations thereof. Additionally, by way of example and not limitation, while a servo mechanism is described herein the disclosure and may importantly be responsible for the powerful performance of physical medicine drop device 100 despite its compact size, the disclosure is not so limited. Any mechanism which may achieve the forces required as herein described may be substituted to assemble physical medicine drop device 100 of the disclosure. Similarly, other listed parts may comprise similar variations and substitutions which may not be described specifically herein, and variations and substitutions known by those having ordinary skill in the art may be made in accordance with this disclosure. Due to variations in body sizes, including but not limited to height, weight, torso size, disability, etc., a variety of considerations may be considered in regard to physical medicine drop device 100 size and shape and mechanisms thereof. Physical medicine drop device 100 may be customized for individual users body size and/or shape, may be sized to fit a substantial portion of the population (i.e. a one-size-fits-all device) or may be offered in a number of sizes and ranges to accommodate different users (e.g. child vs. adult, male vs. female, heavy patients, pregnant women, people with disabilities, etc.). As contemplated herein, physical medicine drop device 100 may be custom designed or manufactured to enable treatment of people having disabilities and/or mobility issues, or physical medicine drop device 100 may be configured to be used with certain accessories or accessibility devices to enable its use with those having specific disabilities or limited mobility. Yet still, though the inventor has contemplated one method of assembling physical medicine drop device 100 to accomplish the intended result of relieving and/or curing back problems and any related benefits such as relieving lung, heart issues or other health issues, the disclosure is not limited to the drawings and descriptions contained herein. For example, the arrangement of parts or use of physical medicine drop device 100 may be customized or targeted during manufacture or use for an individual patient's particular back-related problem (e.g. a herniated disk at a specific location may require the addition or removal of various components or simply their use or non-use), a range of problems across a spectrum of patients suffering similar ailments, or may be customized in vitro, in office, or at home by a patient or doctor to explore different configurations to best accomplish the intended result(s). While the disclosure specifies a battery-powered device, the batteries of which may be primary or secondary batteries, the device may also receive power from an outlet designed for consumer or commercial electronics, which may include the capability to re-charge secondary batteries. Yet still, though the invention as disclosed and drawn is focused to the reduction of pain of the back and/or other chiropractic treatments, the disclosure is not so limited and it may have similar effects upon other areas of the body including but not limited to the groin area, the buttocks, the legs, the neck, the chest, the like and/or combinations thereof through facilitating therapeutic exercises and/or rehabilitation of those areas. While bottom surface 110 of the disclosure is illustrated to have housed therein 4 of lifting pad 120, the disclosure is not so limited. Variations may include any positive integer number of lifting pad 120 as well as lifting pad 120 of various sizes and strengths of lifting pad assembly 101. Additionally, bottom surface 110 may be modular so as to operably combine with compatible devices, including multiple devices of the disclosure, or may be separable into component devices such that, for example, a 4-lifting pad 120 device of the disclosure may comprise 4 independent lifting pad assembly 101 of the disclosure which are separable from one another and may operate independently and/or in combination, depending on the design of manufacture and desires of users of the device of the disclosure.

The foregoing description and drawings comprise illustrative embodiments of the present disclosure. Having thus described exemplary embodiments, it should be noted by those ordinarily skilled in the art that the within disclosures are exemplary only, and that various other alternatives, adaptations, and modifications may be made within the scope of the present disclosure. Merely listing or numbering the steps of a method in a certain order does not constitute any limitation on the order of the steps of that method. Many modifications and other embodiments of the disclosure will come to mind to one ordinarily skilled in the art to which this disclosure pertains having the benefit of the teachings presented in the foregoing descriptions and the associated drawings. Although specific terms may be employed herein, they are used in a generic and descriptive sense only and not for purposes of limitation. Moreover, the present disclosure has been described in detail, it should be understood that various changes, substitutions and alterations can be made thereto without departing from the spirit and scope of the disclosure as defined by the appended claims. Accordingly, the present disclosure is not limited to the specific embodiments illustrated herein, but is limited only by the following claims.

The invention claimed is:

1. A physical medicine drop device comprising:

a housing having at least one surface atop said housing along a top plane of said housing;

a first pushing mechanism housed within said housing beneath said at least one surface, said first pushing mechanism is connected to a first padded element;

said first padded element has a first padded surface, said first padded surface aligns substantially with said top plane of said housing;

a first actuator capable of causing said first pushing mechanism to displace said first padded element relative to said at least one surface;

a second pushing mechanism housed within said housing beneath said at least one surface, said second pushing mechanism is connected to a second padded element;

said second padded element has a second padded surface, said second padded surface aligns substantially with said top plane of said housing and is located a distance from said first padded element, said at least one surface therebetween said first and said second padded elements; and a second actuator capable of causing said second pushing mechanism to displace said second padded element relative to said at least one surface;

wherein each of said first and said second pushing mechanisms comprises a motor, at least one horn, a tension block housing a bolt, a lateral die spring surrounding said bolt, an insert configured to receive and secure said bolt, at least two bearings, a washer, and a lifter pin;

wherein each said motor, said horn, said bolt, said lateral die spring, said insert, said bearings, said washer, and said lifter pin are arranged in operable combination to convert rotational motion into vertical displacement of the corresponding padded element.

2. The device of claim 1, further comprising a power supply capable of providing power to said first and said second pushing mechanisms.

3. The device of claim 2, wherein said power supply is a power adapter.

4. The device of claim 2, wherein said power supply is a rechargeable battery.

5. The device of claim 4, further comprising:

a third pushing mechanism housed within said housing beneath said at least one surface, said third pushing mechanism is connected to a third padded element;

said third padded element has a third padded surface, said third padded surface aligns substantially with said top plane of said housing;

a third actuator capable of causing said third pushing mechanism to displace said third padded element relative to said at least one surface;

a fourth pushing mechanism housed within said housing beneath said at least one surface, said fourth pushing mechanism is connected to a fourth padded element;

said fourth padded element has a fourth padded surface, said fourth padded surface aligns substantially with said top plane of said housing and is located a distance from said first, second, and third padded elements, said at least one surface there among said first, second, third, and fourth padded elements; and a fourth actuator capable of causing said fourth pushing mechanism to displace said fourth padded element relative to said at least one surface.

6. The device of claim 5, wherein said first actuator is a first remote activated actuator in wireless communication with said first pushing mechanism, said second actuator is a second remote activated actuator in wireless communication with said second pushing mechanism, said third actuator is a third remote activated actuator in wireless communication with said third pushing mechanism, and said fourth actuator is a fourth remote activated actuator in wireless communication with said fourth pushing mechanism.

7. The device of claim 6, wherein said first, second, third, and fourth remote activated actuators are housed on a remote activation device.

8. The device of claim 7, wherein the first, second, third, and fourth remote activated actuators are a plurality of switches of said remote actuation device, each of said plurality of switches having an on position and an off position, said remote actuation device has an activation button capable of transmitting to said physical medicine drop device according to said on position and said off position of said plurality of switches, causing said first, second, third, and fourth pushing mechanisms having a corresponding on position to displace one or more corresponding padded element relative to said at least one surface.

9. The device of claim 8, wherein each said first, said second, said third and said fourth pushing mechanisms are configured to deliver a lifting force at a rate of more than once per second.

10. The device of claim 1, wherein said first actuator is a first remote activated actuator in wireless communication with said first pushing mechanism and said second actuator is a second remote activated actuator in wireless communication with said second pushing mechanism.

11. The device of claim 1, wherein said first and said second pushing mechanisms are configured to deliver a lifting force at a rate of more than once per second.

12. A method of performing a physical medicine drop procedure upon a patient, the method comprising:

providing a device comprising:

a housing having at least one surface atop said housing along a top plane of said housing;

a first pushing mechanism housed within said housing beneath said at least one surface, said first pushing mechanism is connected to a first padded element;

said first padded element has a first padded surface, said first padded surface aligns substantially with said top plane of said housing;

a first actuator capable of causing said first pushing mechanism to displace said said first padded element relative to said at least one surface;

a second pushing mechanism housed within said housing beneath said at least one surface, said second pushing mechanism is connected to a second padded element;

said second padded element has a second padded surface, said second padded surface aligns substantially with said top plane of said housing and is located a distance from said first padded element, said at least one surface therebetween said first and said second padded elements; and a second actuator capable of causing said second pushing mechanism to displace said second padded element relative to said at least one surface;

wherein each of said first and said second pushing mechanisms comprises a motor, at least one horn, a tension block housing a bolt, a lateral die spring surrounding said bolt, an insert configured to receive and secure said bolt, at least two bearings, a washer, and a lifter pin;

wherein each said motor, said horn, said bolt, said lateral die spring, said insert, said bearings, said washer, and said lifter pin are arranged in operable combination to convert rotational motion into vertical displacement of the corresponding padded element;

placing said device between the patient and a patient surface; and actuating at least one of said first pushing mechanism and said second pushing mechanism via at least one of said first actuator and said second actuator to cause at least one of said first padded element and said second padded element to displace relative to said at least one surface and provide a force push upward upon the patient in a treatment area.

13. The method of claim 12, wherein said first and said second pushing mechanisms are configured to deliver a lifting force at a rate of more than once per second.

14. The method of claim 13, further comprising a step of successively actuating at least one of said first pushing mechanism and said second pushing mechanism via at least one of said first actuator and said second actuator to cause at least one of said first padded element and said second padded element to displace relative to said at least one surface and provide successive forces upon the patient in the treatment area.

15. The method of claim 14, further comprising a step of applying a pressure upon said treatment area opposite said device.

16. The method of claim 13, further comprising a step of applying a downward pressure opposite said treatment area of said patient.

17. The method of claim 12, wherein said first actuator is a first remote activated actuator in wireless communication with said first pushing mechanism and said second actuator is a second remote activated actuator in wireless communication with said second pushing mechanism.

18. The method of claim 17, further comprising a step of actuating at least one of said first pushing mechanism and said second pushing mechanism via at least one of said first remote activated actuator and said second remote activated actuator.

19. The method of claim 12, wherein said device further comprises:

a third pushing mechanism housed within said housing beneath said at least one surface, said third pushing mechanism is connected to a third padded element;

said third padded element has a third padded surface, said third padded surface aligns substantially with said top plane of said housing;

a third actuator capable of causing said third pushing mechanism to displace said third padded element relative to said at least one surface;

a fourth pushing mechanism housed within said housing beneath said at least one surface, said fourth pushing mechanism is connected to a fourth padded element;

said fourth padded element has a fourth padded surface, said fourth padded surface aligns substantially with said top plane of said housing and is located a distance from said first, second, and third padded elements, said at least one surface there among said first, second, third, and fourth padded elements; and a fourth actuator capable of causing said fourth pushing mechanism to displace said fourth padded element relative to said at least one surface.

20. The method of claim 19, further comprising the step of actuating at least one of said first pushing mechanism, said second pushing mechanism, said third pushing mechanism, and said fourth pushing mechanism via at least one of said first actuator, said second actuator, said third actuator, and said fourth actuator to cause at least one of said first padded element, said second padded element, said third padded element, and said fourth padded element to displace relative to said at least one surface and provide a force upon the patient.

* * * * *